US006437205B1

(12) United States Patent
Miller et al.

(10) Patent No.: US 6,437,205 B1
(45) Date of Patent: Aug. 20, 2002

(54) LOW MOLECULAR WEIGHT HIGH-CIS POLYBUTADIENES AND THEIR USE IN HIGH MOLECULAR WEIGHT-LOW MOLECULAR WEIGHT HIGH-CIS POLYBUTADIENE BLENDS

(75) Inventors: H. Jerrold Miller, Akron; Tatsuro Hamada; Yoichi Ozawa, both of Copley; Peyman Pakdel, Akron, all of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/600,150

(22) PCT Filed: May 19, 2000

(86) PCT No.: PCT/US00/14098

§ 371 (c)(1),
(2), (4) Date: Jul. 10, 2000

(87) PCT Pub. No.: WO00/69928

PCT Pub. Date: Nov. 23, 2000

Related U.S. Application Data

(63) Continuation of application No. 09/314,203, filed on May 19, 1999, and a continuation of application No. 09/314,791, filed on May 19, 1999.

(51) Int. Cl.[7] .................................................. C10L 1/16
(52) U.S. Cl. .................. 585/12; 585/507; 525/236; 525/237; 525/241; 525/242; 526/153; 526/164; 526/335; 526/340.4
(58) Field of Search ............. 585/507, 12; 526/153, 526/164, 335, 340.4; 525/236, 237, 241, 242

(56) References Cited

U.S. PATENT DOCUMENTS

| | | | |
|---|---|---|---|
| 3,329,734 A | | 7/1967 | Schleimer et al. |
| 3,428,699 A | * | 2/1969 | Schleimer |
| 3,725,492 A | * | 4/1973 | Ukita et al. |
| 3,852,373 A | * | 12/1974 | Hesse et al. |
| 4,304,885 A | | 12/1981 | Toshio et al. |
| 4,383,097 A | * | 5/1983 | Castner et al. |
| 5,017,539 A | * | 5/1991 | Jenkins et al. |
| 5,428,119 A | * | 6/1995 | Knauf et al. |
| 5,567,784 A | * | 10/1996 | Wieder et al. |
| 5,686,371 A | * | 11/1997 | Ansell et al. |
| 5,744,415 A | * | 4/1998 | Wenzel |
| 5,877,109 A | * | 3/1999 | Reichert et al. |
| 5,908,904 A | * | 6/1999 | Sylvester et al. |
| 5,959,039 A | * | 9/1999 | Yokoyama et al. ......... 525/236 |

FOREIGN PATENT DOCUMENTS

| | | |
|---|---|---|
| EP | 0 471 446 A | 2/1992 |
| EP | 0 751 181 A2 * | 2/1997 |
| EP | 0 846 707 A | 6/1998 |
| EP | 0 924 256 A | 6/1999 |
| EP | 0 957 115 A | 11/1999 |
| GB | 964 931 A | 7/1964 |
| WO | WO 93 05083 A | 3/1993 |
| WO | WO 98 07783 A | 2/1998 |

OTHER PUBLICATIONS

Database WPI; Section Ch, Week 198737; Derwent Publications Ltd., London, GB; Class A12; AN 1987–260135;XP002149701 & JP 62 179542 A (UBE IND LTD); Aug. 6, 1987; Abstract.
Japanese Patent Publication (Kokai) No. 8–73515 pub Mar. 19, 1996 both Japanese language version and an English Translation.*
Japanese Patent Publication No. 7–5789 Published Jan. 25, 1995 both Japanese language version and an English translation.*
Article entitled Studies on Nickel–Containing Ziegler–Type Catalysts. I. New Catalysts for High–cis–1,4–polybutadiene in Bull. Chem. Soc. Jpn., vol. 65, pp 1299–1306 (May 1, 1992) published by the Chemical Society of Japan.*
Article entitled Studies on Nickel–Containing Ziegler–Type Catalysts. II. Low Molecular Weight (Liquid) poly(diene)s with 1,4–Microstructure in Bull. Chem. Soc. Jpn., vol. 65, pp 11307–1312 (May 1, 1992) published by the Chemical Society of Japan.
Article entitled The Preparation, Modification and Applications of Nonfunctional Liquid Polybutadienes in Rubber Chem and Tech, vol. 54, pp 596–626 (Jan. 1, 1981) published by American Chemical Society, Rubber Division, Akron, Ohio.
Article entitled Polymerizations of Butadiene with $Ni(acac)_2$–methylaluminoxane catalysts in Macromol. Chem. Phys. vol. 197, pp 3515–3521 (Nov. 1, 1996) published by Huthig & Wepf Verlag, Zug.

* cited by examiner

Primary Examiner—Jacqueline V. Howard
(74) Attorney, Agent, or Firm—Meredith Palmer; Jude Fry

(57) ABSTRACT

A process for polymerizing 1,3-butadiene into a low molecular weight high-cis polybutadiene is described using a catalyst system comprising: (a) a neodymium-containing compound, (b) an aluminoxane or a trialkyl aluminum compound, (c) an organoaluminum hydride, and (d) a halogen source. A blend of a high molecular weight high-cis polybutadiene and the low molecular weight high-cis polybutadiene is also disclosed for use in pneumatic tire treads. Desirably both the high and the low molecular weight polymers have high cis contents, with the low molecular weight polymer being at least 70 percent cis and the high molecular weight polymer being at least 92 percent cis. Desirably both polymers are made with a neodymium catalyst system. The blends provide a balance of properties including good snow traction, wet traction, and rolling resistance while providing a balance of good physical properties including tension at break, modulus etc.

78 Claims, No Drawings

LOW MOLECULAR WEIGHT HIGH-CIS POLYBUTADIENES AND THEIR USE IN HIGH MOLECULAR WEIGHT-LOW MOLECULAR WEIGHT HIGH-CIS POLYBUTADIENE BLENDS

This application is a 371 of PCT/US00/14098 filed May 19, 2000, which is a continuation of Ser. No. 09/314,203 filed May 19, 1999 and 90/134791 filed May 19, 1999

FIELD OF INVENTION

The present invention relates to low molecular weight high-cis polybutadienes synthesized with a catalyst system that comprises a neodymium-containing compound, an organoaluminum hydride, and a halide source in combination with either an alkyl aluminoxane or a trialkyl aluminum compound. Blends of these low molecular weight high-cis polybutadienes and high molecular weight high-cis polybutadienes are further disclosed for use in tire tread compounds to enhance fracture properties, snow traction, wet traction, and rolling resistance of a tire.

BACKGROUND OF THE INVENTION

In the past, low molecular weight polybutadienes have generally been prepared using Nickel- and Cobalt-based Ziegler catalysts with specific molecular weight regulators. These molecular weight regulators have been problematic. More particularly, it is generally accepted that these molecular weight regulators broaden the molecular weight distribution or reduce the rate of polymerization. For example, as shown in an article in Bull. Chem. Soc. Jpn., 65, pp.1307–1312 (1992) at Tables 3 and 4, the use of these molecular weight regulators in combination with co-ordination catalysts has in the past generally resulted in a decrease in the cis-1,4 content.

Japanese Patent Publication 8-73515 discloses the polymerization of dienes with Group 3B metal (including neodymium) catalyst systems, wherein molecular weight regulators are not used in the polymerization process. The methods taught therein are applicable to a situation for making a high molecular weight high-cis polybutadiene with a narrow molecular weight distribution. But the method taught therein, as shown in the examples, generally produced a very broad molecular weight distribution if used to form a low molecular weight high-cis polybutadiene.

More particularly, while the data in that application indicated that narrow molecular weight distributions were possible at number average molecular weights of 250,000 and above (see Table 1 Practical Examples 1–5), all of the examples producing number average molecular weights below 150,000 resulted in broad molecular weight distributions (e.g. 5.5–6.3). Molecular weight distributions are the weight average molecular weight divided by the number average molecular weight. Narrow molecular weight distributions are generally achieved by controlling the initiation of polymer chains, termination of polymer chains and the lifetime of each polymer chain so that each and every polymer chain grows for the same period of time and consequently grows to approximately the same molecular weight.

Moreover, it is known that low molecular weight polybutadienes can be blended with high molecular weight high-cis polybutadienes. These known low molecular weight polybutadienes, however, having a broad molecular weight distribution and/or a reduced cis-1,4 content, cannot be readily used in these blends. For example, because of the broad molecular weight distribution, it is difficult to determine and/or optimize properties. In addition, miscibility becomes a problem when these liquid polybutadienes, varying significantly in the cis-1,4 content from a higher molecular weight polybutadiene, are used together in blends.

The effects of blends of these high molecular weight/low molecular weight (HMW/LMW) high-cis polybutadiene on the properties of a rubber compound have not been thoroughly investigated. Japanese Patent Publication No. 7-5789, published on the Aug. 6, 1987, disclosed blends of HMW/LMW polybutadiene for use in impact modified polystyrene. Further, Bridgestone Corporation has examined the use of HMW/LMW blends of low-cis polybutadiene for improved wet/snow properties. But nothing has disclosed blends of HMW/LMW blends of low-cis polybutadiene particularly beneficial for use in tread compositions.

Thus, there presently exists a need for a low molecular weight high cis-1,4 polybutadiene having properties suitable for blending with a high molecular weight high-cis polybutadiene, the resultant blend being useful in tire tread compounds.

SUMMARY OF THE INVENTION

In part, the present invention relates to a low molecular weight high cis-1,4 polybutadiene and an improved process for polymerization of dienes to a low molecular weight high-cis polybutadiene using either of two neodymium-based catalyst systems. One such catalyst system is referred to throughout as an MAO catalyst system and comprises: (a) a neodymium-containing compound; (b) an aluminoxane; (c) an organoaluminum hydride compound; and (d) a halide source. While neodymium-based catalyst systems are known to produce high-cis polybutadiene, the use of these four catalyst components to yield a liquid high-cis polybutadiene with a narrow molecular weight distribution was not known. The catalyst system is operational under a variety of conditions.

The resulting polydiene has (a) at least 80 mole percent cis-1,4-butadiene microstructure; (b) a molecular weight distribution of less than 3.1; and (c) a number average molecular weight from about 2000 to about 50,000.

Another such neodymium-based catalyst system disclosed herein, and referred to throughout as a TIBA catalyst system, comprises: (a) a neodymium-containing compound; (b) a trialkyl aluminum compound; (c) an organoaluminum hydride compound; and (d) a halide source. At least 80 weight percent of the resulting polydiene has a molecular weight less than 100,000. In addition, the polydiene has a number average molecular weight less than 35,000; and a ratio of Mp (peak molecular weight) to Mn (number average molecular weight) between about 0.9 and about 2.0. This catalyst system is useful where environmental considerations dictate against the use of hexane-insoluble aluminoxanes in the polymerization process.

Moreover, the present invention also relates to low molecular weight/high-cis polybutadiene blends containing either of these low molecular weight high-cis polybutadienes. In this regard, the present invention relates to a high-cis polybutadiene blend, which comprises: (a) from about 20 to about 80 percent by weight of a first polybutadiene having a number average molecular weight from about 2000 to about 50,000 and a cis-1,4 microstructure content of at least 70 percent; and (b) from about 20 to about 80 percent by weight of a second polybutadiene having a number average molecular weight from about 90,000 to about 300,000, and a cis-1,4 microstructure content of at least 92 percent.

The present invention further relates to a rubber compound, which comprises at least 30 parts by weight of a high cis-1,4-polybutadiene based upon 100 parts by weight rubber wherein a) from about 20 to about 80 weight percent of the high cis-1,4-polybutadiene is a low molecular weight high-cis polybutadiene of the present invention has a molecular weight from about 2,000 to about 50,000 and a cis-1,4 content of at least 70 percent; and b) from about 20 to about 80 weight percent of the high cis-1,4-polybutadiene is a high molecular weight high-cis polybutadiene having a molecular weight from about 90,000 to about 300,000 and a cis-1,4- microstructure of at least 92 percent. Desirably these two fractions of high-cis polybutadiene represent distinct peaks (or modes) in the molecular weight distribution of the high-cis polybutadiene. Desirably the molecular weight distribution of the lower molecular weight peak is from about 1.1 to about 5 and the molecular weight distribution of the higher molecular weight peak in the distribution is from about 1.8 to about 6. These rubber characteristics facilitate achieving a balance of good fracture resistance, snow traction, wet traction, and low rolling resistance.

DETAILED DESCRIPTION OF THE INVENTION

A process is disclosed below for producing low molecular weight high-cis polybutadiene with a specific molecular weight distribution by polymerizing 1,3-butadiene in the presence of either of two catalyst systems comprising: (a) a neodymium-containing compound; (b) an aluminoxane in the MAO catalyst system or a trialkyl aluminum compound in the TIBA catalyst system; (c) an organoaluminum hydride compound; and (d) a halogen source. Referring particularly to the MAO catalyst system, it differs from JP 8-73515 in that it teaches generally higher amounts of all of the catalyst components relative to the diene, preferred amounts of total aluminum relative to butadiene, and preferred catalyst preparation and aging procedures. One skilled in the art would not anticipate that the molecular weight could be reduced to the extent that liquid polybutadiene was produced without the use of molecular weight regulators. Evaluation of the ratio of the neodymium-containing compound and the total polymers formed in the examples reveals that multiple polymer chains are produced per each neodymium containing compound, so some mechanism of chain termination and chain initiation is taking place which has the same result as chain transfer without broadening the molecular weight distribution.

For the component (a) of the catalyst system, various neodymium-containing compounds can be utilized. It is generally advantageous to employ neodymium-containing compounds that are soluble in a hydrocarbon solvents such as aromatic hydrocarbons, aliphatic hydrocarbons, or cycloaliphatic hydrocarbons. The neodymium-containing compound is desirably soluble in aliphatic or cycloaliphatic solvents at 25° C. to an extent of at least 0.2 mole/liter.

The neodymium in the neodymium-containing compounds can be in various oxidation states. It is preferable to use trivalent neodymium compounds, wherein the neodymium is in the +3 oxidation state. Suitable types of neodymium-containing compounds that can be utilized in the catalyst system include, but are not limited to, neodymium carboxylates, neodymium β-diketonates, neodymium alkoxides and aryloxides, neodymium halides, neodymium pseudo-halides, organoneodymium compounds, and neodymium phosphates or phosphites. The phosphates and phosphites of Group 3B elements are set forth in JP 8-73515, which is hereby incorporated by reference. In this invention, the neodymium carboxylates are preferred over other choices. Disubstituted phosphonates may also be used. Composite salts, in which one of the three ligands is different from the other two, may also be used. A Lewis base may also be present as a stabilizer.

Desirably the neodymium carboxylate is of the formula $(R^4)_3Nd$ where $R^4$ is a saturated, monounsaturated, or polyunsaturated mono or polycarboxylate of 1 to 20 carbon atoms. Preferably $R^4$ is a straight, branched, or cyclic chain with the carboxyl group bonded to a primary, secondary or tertiary carbon atom. Specific examples of $R^4$ include octanoic acid, 2-ethyl hexanoic acid, oleic acid, stearic acid, versatic acid, neodecanoic acid, benzoic acid, naphthenic acid and bursatic acid (a tradename of a carboxylic acid with the carboxyl group bound to a tertiary carbon atom, manufactured by Shell Chemicals). Some specific examples of suitable neodymium carboxylates include neodymium(III) formate, neodymium(III) acetate, neodymium(III) acrylate, neodymium(III) methacrylate, neodymium(III) valerate, neodymium(III) gluconate, neodymium(III) citrate, neodymium(III) fumarate, neodymium (III) lactate, neodymium(III) maleate, neodymium(III) oxalate, neodymium(III) 2-ethylhexanoate, neodymium(III) neodecanoate, neodymium(III) naphthenate, neodymium (III) stearate, neodymium(III) oleate, neodymium(III) benzoate, and neodymium(III) picolinate.

Desirably the neodymium alkoxide is of the formula $(R^4O)_3Nd$ where $R^4$ is a linear, branched or cyclic alkyl, or aromatic group of 1,3 or 6 (as appropriate) to 20 carbon atoms. Some specific examples of suitable neodymium alkoxides or aryloxides include neodymium(III) methoxide, neodymium(III) ethoxide, neodymium(III) isopropoxide, neodymium(III) 2-ethylhexoxide, neodymium(III) phenoxide, neodymium(III) nonylphenoxide, and neodymium(III) naphthoxide.

Examples of the β-diketone complexes include acetylacetone, benzoylacetone, propionnitrileacetone, valerylacetone and ethyl acetylacetone complexes of the metal.

Examples of the phosphates or phosphites of the metal include bis(2-ethylhexyl)phosphate, bis(1-methylbutyl) phosphate, bis(p-nonylphenyl)phosphate, bis(polyethylene glycol-p-nonylphenyl)phosphate, (1-methylheptyl)(2-ethylhexyl)phosphate, (2-ethylhexyl)(p-nonylphenyl) phosphate, 2-ethylhexyl phosphonate mono-2-ethylhexyl, 2-ethylhexyl phosphonate mono-p-nonylphenyl, bis(2-ethylhexyl)phosphinate, bis(1-methylbutyl)phosphinate, bis (p-nonylphenyl)phosphinate, (1-methylheptyl)(2-ethylhexyl)phosphinate, (2-ethylhexyl)(p-nonylphenyl) phosphinate, and other salts.

The component (b) of the catalyst system is an alkylaluminoxane in the MAO catalyst system or, in the alternative, a trialkyl aluminum compound in the TIBA catalyst system. These are well known to the art. Examples of the alkylaluminoxane component include compounds with the formulas

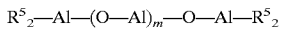

or

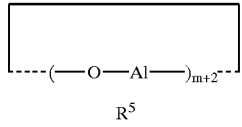

where m is an integer greater than 2 and preferably greater than or equal to 5 and most preferably 2, 5, or 10 to 100.

$R^5$ is a hydrocarbon group of 1 to 6 carbon atoms such as methyl, ethyl, propyl and butyl groups. Preferably $R^5$ is methyl or ethyl. Preferred alkylaluminoxanes are methyl aluminoxane, ethyl aluminoxane, propyl aluminoxane, butyl aluminoxane, and isobutyl aluminoxane. It should be noted that moles or millimoles of aluminoxanes as used in this application refers to moles of Al—$R^5$ rather than moles of the oligomer or cyclic compound. This is conventional in the art of catalysis with aluminoxanes.

Suitable examples of trialkyl aluminum compounds for practice in the present invention include trimethyl aluminum, triethyl aluminum, tri (iso- or n-) propyl aluminum, tri-isobutyl or tri-n-butyl aluminum, etc. In the preferred embodiment, the trialkyl aluminum compound is tri-isobutyl aluminum.

The component (c) of the catalyst system is an organoaluminum hydride compound. As used herein, the term "an organoaluminum hydride compound" refers to any aluminum compound containing at least one covalent aluminum-carbon bond and at least one covalent aluminum-hydrogen bond. It is generally advantageous to employ organoaluminum hydride compounds that are soluble in the hydrocarbon polymerization medium. Thus suitable types of organoaluminum hydride compounds that can be utilized in the catalyst system include, but are not limited to, dihydrocarbylaluminum hydride compounds and hydrocarbylaluminum dihydride compounds, which are represented by the formula $AlH_nR_{3-n}$ (n=1 or 2), wherein each R, which may be the same or different, is selected from the group consisting of alkyl, cycloalkyl, aryl, aralkyl, alkaryl, and allyl groups; each group preferably contains from 1 or the appropriate minimum number of carbon atoms to form this group to 20 carbon atoms. Dihydrocarbylaluminum hydride compounds are generally preferred.

Some specific examples of suitable organoaluminum hydride compounds that can be utilized in the catalyst system are: diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride and other organoaluminum monohydrides. Also included are ethylaluminum dihydride, n-propylaluminum dihydride, isopropylaluminum dihydride, n-butylaluminum dihydride, isobutylaluminum dihydride, and n-octylaluminum dihydride and other organoaluminum dihydrides. Mixtures of the above organoaluminum hydride compounds may also be utilized.

The catalyst system for low molecular weight polybutadienes further comprises a halide source as the component (d). The halide source can be either 1) a halogenated organic (hydrocarbon) compound, 2) a halogenated alkyl metal compound such as halogenated alkyl aluminum, halogenated alkyl magnesium, compounds with silicon chloride bonds such as trialkylsilicon chloride, or halogenated alkyl zinc; or 3) a metal halide such as magnesium chloride, tin chloride, or silicon tetrachloride. The halogen of the halogen source can be chlorine, bromine, fluorine or iodine. The halogen source may have one or more halogen atoms per molecule. If it is an organic halogen containing compound, it desirably has from about 1, 2, or 3 to about 15 or 20 carbon atoms. The organic compound may be linear, branched, cyclic, aromatic, etc. It is preferred to have an organic compound with a labile halogen atom. Examples of such compounds include tertiary carbons, aromatic carbons, and allylic carbons. Preferred halogen sources include benzoyl chloride, benzyl chloride, benzylidene chloride, allyl chloride, propionyl chloride, allyl chloride, and t-butyl chloride; the brominated versions of the above compounds; methyl chloroformate or methyl bromoformate; and chloro-di-phenylmethane or chloro-tri-phenylmethane; and the like. The halogenated alkyl aluminum compound desirably has the structure $AlX_nR^6_{(3-n)}$ where X is the above listed halogen, $R^6$ is a hydrocarbon with from 1 to 8 carbon atoms, and n is 1 or 2. Examples of said halogenated alkyl aluminum include dimethyl aluminum chloride, diethyl aluminum chloride, diethyl aluminum bromide, diethyl aluminum iodide, diethyl aluminum fluoride, di-n-propyl aluminum chloride, di-n-butyl aluminum chloride, di-isobutyl aluminum chloride, methyl aluminum-di-chloride, ethyl aluminum-di-chloride isobutyl aluminum-di-chloride, sesquimethyl aluminum chloride, sesquiethyl aluminum chloride, sesqui-isobutyl aluminum chloride and mixtures thereof. The metal halides include aluminum trichloride, aluminum tribromide, aluminum triiodide, aluminum trifluoride etc. and mixtures thereof.

The catalyst system comprises the above-described four components (a), (b), (c), and (d) as the main components. In addition to the four catalyst components (a), (b), (c), and (d), other catalyst components such as other organometallic compounds or Lewis bases, which are known in the art, can be added.

The catalyst system has very high catalytic activity over a wide range of total catalyst concentrations and catalyst component ratios. The four catalyst components (a), (b), (c), and (d) apparently interact to form the active catalyst species. Accordingly, the optimum concentration for any one catalyst component depends on the concentrations of the other catalyst components. While polymerization will occur over a wide range of catalyst concentrations and catalyst component ratios, polymers having the most desirable properties are obtained with a narrow range of catalyst concentrations and catalyst component ratios.

The molar ratio of the aluminoxane to the neodymium-containing compound (Al/Nd) in the MAO catalyst system can be varied from about 10 to about 500. However, a more preferred range of Al/Nd molar ratio is from about 40 or 50 to about 200, and the most preferred range is from about 75 to about 150. The molar amount of aluminoxane is the number of moles of Al—$R^5$ units rather than the moles of the oligomer or cyclic aluminoxane. This is consistent with the effectiveness of aluminoxane in this type of catalyst system.

The molar ratio of the trialkyl aluminum compound to the neodymium-containing compound (TIBA/Nd) in the TIBA catalyst system can be varied from about 30 to about 200. However, a more preferred range of TIBA/Nd molar ratio is from about 30 to about 100, and the most preferred range is from about 40 to about 60.

The molar ratio of the organoaluminum hydride compound to the neodymium-containing compound (Al/Nd) in the MAO catalyst system can be varied from about 10 to about 100. The more preferred range of Al/Nd molar ratio is from about 10 to about 50 or 60, and the most preferred range is from about 15 to about 25 or 30.

The molar ratio of the organoaluminum hydride compound to the neodymium-containing compound (Al/Nd) in the TIBA catalyst system can be varied from about 1 to about 100. The more preferred range of Al/Nd molar ratio is from about 10 to about 50, and the most preferred range is from about 10 to about 30.

The molar ratio of the halogen source to the neodymium-containing compound (Halogen/Nd) in the MAO catalyst system can be varied from about 1 to about 15, with the more preferred range of halogen/Nd molar ratio being from about 2 to about 8 and the most preferred range being from about 2 to about 6.

Referring now to the TIBA catalyst system, the molar ratio of the halogen source to the neodymium-containing compound (Halogen/Nd) can be varied from about 2 to about 16, with the more preferred range of about 2 to about 12, and a most preferred range of about 4 to about 12.

The total catalyst concentration in the polymerization mass depends on such factors as the purity of the components, the polymerization rate and conversion desired, the polymerization temperature, and the like. Accordingly, specific total catalyst concentrations cannot be definitively set forth except to say that catalytically effective amounts of the respective catalyst components should be used.

Generally, the amount of the neodymium-containing compound used in the MAO catalyst system can be varied from about 0.1 to about 3 mmol per 100 g of 1,3-butadiene, with a more preferred range being from about 0.2 to about 2 mmol per 100 g of 1,3-butadiene and the most preferred range being from about 0.3 to about 1.5 mmol per 100 g of 1,3-butadiene.

As to the TIBA catalyst system, the amount of neodymium-containing compound used can be varied from about 0.1 to about 1.0 mmol per 100 g of 1,3-butadiene, with a more preferred range being about 0.2 to about 0.6 mmol per 100 g of 1,3-butadiene, and a most preferred range of about 0.2 to 0.4 mmol per 100 g 1,3-butadiene.

Certain specific total catalyst concentrations and catalyst component ratios which produce polymers having desired molecular weight and molecular weight distributions will be illustrated in the examples given to explain the teachings of the present invention.

The diene component is preferably butadiene but may include other nonhalogenated conjugated dienes with from 4 to 8 carbon atoms. Examples of other dienes are isoprene, 1,3-hexadiene, etc. It is desirable in the preferred embodiment that at least 80 mole percent of the repeat units of the polymer be derived from polymerizing butadiene, more desirably at least 85 mole percent are from butadiene and preferably at least 90 or 95 mole percent are from polymerizing butadiene.

Referring particularly to the MAO catalyst system, it has been discovered that relatively large amounts of aluminum are required to achieve the high-cis liquid polydienes. If the ratios set forth in this invention are maintained between various catalyst components, it is not critical which component or components of the catalyst system are the sources of the necessary aluminum. A desirable amount of total aluminum (from all of the catalyst sources) is from about 0.01 to about 0.1 mole of aluminum per mole of diene (e.g. butadiene).

It is desirable that the resulting polymer using either the MAO or TIBA catalyst system has at least 75 or 80 mole percent repeat units of the cis-1,4 microstructure, more desirably at least 80 mole percent and preferably at least 85 mole percent.

It is desirable that the low molecular weight polymer prepared in accordance with the MAO catalyst system has a number average molecular weight from about 2000 to about 50,000, and more desirably from about 4,000 to about 25,000. It is desirable that the resulting polymer have a molecular weight distribution (defined as the weight average molecular weight (Mw) divided by the number average molecular weight (Mn)) of less than 3.1 and preferably from about 1.2 to about 2.2.

Referring to the low molecular weight polymer of the TIBA catalyst system, preferably at least 80 weight percent of that polymer (by GPC) has a molecular weight less than 100,000, and more desirably, at least 85 weight percent of that polymer has a molecular weight less than 100,000. In the preferred embodiment at least 88 weight percent of that polymer has a molecular weight less than 100,000. Moreover, the resilient polymer preferably has a number average molecular weight (Mn) less than 35,000, more preferably less than 30,000, and most preferably less than 25,000. The ratio Mp/Mn of the polymer preferably varies from about 0.9 to about 2.0.

The catalyst components may be introduced into the polymerization system in several different ways. They may be added in either a stepwise or simultaneous manner. It is desirable to add the halide source as the last component of the catalyst system and preferably after a portion of the total diene has been added. The order in which the components are added in a stepwise manner is not critical to achieve polymerization but may affect the number average molecular weight of the polymer. With respect to the MAO catalyst system, the components are preferably added in the order of the 1) part of the total diene, 2) aluminoxane, 3) neodymium-containing compound, and 4) organoaluminum hydride. As to the TIBA catalyst system, there is no preferred order for the addition of the components, but, again, the halide source must be added last in the polymerization. It is optional to age the reactants for a few seconds to minutes prior to the addition of the halide source. The catalyst components may be premixed outside the polymerization system at an appropriate temperature (e.g., from about 10° C. to about 90° C.), following by the addition of the catalysts to the polymerization system or the catalysts may be mixed in the polymerization reactor. The amount of diene, e.g. 1,3-butadiene monomer, which is desirably added before the halide source, can range from about 10 to about 100 moles per mole of the neodymium-containing compound, and preferably should be from about 10 to about 50 moles per mole of the neodymium-containing compound.

It has been observed by others that increased aging time (after adding the halide source) for these types of initiators usually increases the activity of the catalyst. While preparing the examples it was observed that shorter catalyst aging times generate more polymer chains and consequently, reduce the molecular weight of the resulting polymers. Thus aging time is a compromise between catalyst activity and catalyst efficiency when producing low molecular weight polymers. It is desirable to age the catalyst (after adding the halide source) less than 30 minutes at a temperature of less than 50° C. and more desirably less than 10 minutes at from about 10 to about 50° C. after mixing all the catalyst components and part of the diene.

When a catalyst solution is prepared outside the polymerization system, the organic solvent usable for the catalyst component solution may be selected from aromatic hydrocarbons, aliphatic hydrocarbons and cycloaliphatic hydrocarbons, and mixtures of two or more of the above-mentioned hydrocarbons. Preferably, the organic solvent consists of at least one selected from benzene, toluene, xylene, hexane, heptane and cyclohexane.

The polymerization of 1,3-butadiene via this process is carried out in an organic solvent as the diluent. In such cases, a solution polymerization system may be employed in which both the monomer and the polymer formed are soluble in the polymerization medium. Additional organic solvent may be added. It may be the same as or different from the organic solvent contained in the catalyst component solutions. It is normally desirable to select an organic solvent that is inert with respect to the catalyst system. Suitable types of organic solvents include, but are not limited to, aliphatic, cycloaliphatic, and aromatic hydrocarbons. Some representative examples of suitable aliphatic solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. Some representative examples of suitable cycloaliphatic solvents include cyclopentane, cyclohexane, methylcyclopentane, methylcyclohexane, and the like. Some representative examples of suitable aromatic solvents include benzene, toluene, xylenes, ethylbenzene, diethylbenzene, mesitylene, and the like. Commercial mixtures of the above hydrocarbons may also be used. For environmental reasons, aliphatic and cycloaliphatic solvents are highly preferred. The concentration of the 1,3-butadiene monomer is not limited to a special range. However, generally, it is preferable that the concentration of the diene, e.g. 1,3-butadiene, in the polymerization reaction mixture is in a range of from about 3% to about 80% by weight, but a more preferred range is from about 5% to about 50% by weight, and the most preferred range is from about 10% to about 30% by weight.

A major benefit of the MAO catalyst system process for forming low molecular weight (liquid) high-cis polybutadiene is the lack of added molecular weight regulators, which often decrease the rate of polymerization and lead to broad molecular weight distributions. The process is not, however, free of chain transfer reactions as a close examination of the experimental data will demonstrate that more moles of polymer are generated than can be explained based on the moles of the initiator.

In accordance with either the MAO catalyst system process or the TIBA catalyst system process, the polymerization of 1,3-butadiene may be carried out as a batch process, on a semi-continuous basis, or on a continuous basis. In any case, the polymerization is conducted under anaerobic conditions using an inert protective gas such as nitrogen, argon or helium, with moderate to vigorous agitation. The polymerization temperature may vary widely from a low temperature, such as 10° C. or below, to a high temperature such as 130° C. or above, with a preferred temperature range being from about 20° C. to about 90° C. The heat of polymerization may be removed by external cooling, cooling by evaporation of the 1,3-butadiene monomer or the solvent, or a combination of the two methods. Although the polymerization pressure may vary widely, the preferred pressure range is from about 1 atmosphere to about 10 atmospheres.

After reaching a desired conversion, the polymerization reaction can be stopped by addition of a known polymerization terminator into the polymerization system to inactivate the catalyst system, followed by the conventional steps of desolventization and drying as are typically employed by and are known to those skilled in the art of conjugated diene polymerization. Typically, the terminator employed to inactivate the catalyst system is a protic compound that includes, but is not limited to, an alcohol, a carboxylic acid, an inorganic acid, and water or a combination thereof. An antioxidant such as 2,6-di-tert-butyl-4-methylphenol may be added along with, before or after addition of, the terminator. The amount of the antioxidant employed is usually in the range of 0.2% to 1% by weight of the polymer product.

The polymer may be isolated from the solvents by evaporation (forced or natural) of the solvent from the polymer cement. At low molecular weights, polybutadiene is a liquid and its isolation by coagulation is difficult. Alternatively, the solution of liquid polybutadiene can be blended with a solution of other higher molecular weight rubbers/polymers and then desolventized. This procedure is practical when the low molecular weight polybutadiene is going to be blended before use.

The low molecular weight high-cis polybutadiene product produced by the above process has many applications. It can be blended with various rubbers in order to improve their properties. For example, it can be incorporated into elastomers in order to improve or modify their viscoelastic properties (such as G' and tan $\delta$) at a particular temperature. It has been possible to increase the snow and wet traction of a rubber blend with this low molecular weight high cis-1,4 polybutadiene. These properties are generally correlated with a lower storage modulus (G') at −20° C. and a higher tan $\delta$ at 0° C. respectively when these properties are measured at 1 Hz and small strains.

More particularly, the addition of a blend of this low molecular weight high-cis polybutadiene and a high molecular weight high-cis to a rubber compound has been found to improve properties such as fracture resistance, snow traction, wet traction, and rolling resistance. It is beneficial if the blend has a molecular weight distribution which has at least two modes, with a first mode having a maximum between a molecular weight of 2000 and 50,000 and a second mode having a maximum between a molecular weight of 90,000 and 300,000. It is particularly advantageous that both the high and low molecular weight polybutadienes have similar amounts of cis-1,4 repeating units as this results in enhanced compatibility of the two polymers over blends where the cis-1,4 content varies significantly between the high and low molecular weight polymers. While the high and low molecular weight polymers are generally characterized as two different materials, which are separately prepared, it is specifically acknowledged that due to the similarity in the catalyst systems used to prepare the high and low molecular weight polymers it is beneficial to make both the high and low molecular weight fractions in the same reactor or plant and/or blend them before isolating the polymers from their polymerization media.

The benefit from using a blend of high and low molecular weight high-cis polybutadiene is not limited to rubber compounds where the high and low molecular weight polybutadiene is 100% of the rubber component. In fact these polymers are easily blended with conventional rubbers used in tires. A blend of high and low molecular weight high-cis polybutadiene with one or more other rubbers may be optimized for a total balance of tire or tire tread properties. The weight percent of the high molecular weight high-cis polybutadiene is desirably from about 20 to about 80 percent, and is more desirably from about 25 to about 75 percent, and is preferably from about 30 to about 70 percent of the blend of high and low molecular weight high-cis polybutadienes.

The high molecular weight polybutadiene desirably has a molecular weight or a number average molecular weight from about 90,000 to about 300,000, more desirably from about 150,000 or 200,000 to about 280,000. By using molecular weight alternatively to number average molecular weight it is intended to provide alternative but nearly equivalent options in the claims. Desirably the molecular weight distribution (MWD or Mw/Mn) is from about 1.8 or 2.0 to about 6.0 and more desirably from about 1.8 to about 3.2. Desirably the high molecular weight polybutadiene has a cis-1,4 content of at least 92% and preferably at least 94%. Polymers of this type are commercially available or can be prepared by using catalyst systems based on nickel or neodymium carboxylates, trialkyl aluminum, and a compound with a labile halide. The weight percent of the high molecular weight high-cis polybutadiene is desirably from about 20 to about 80, and is more desirably from about 25 to about 75 percent, and is preferably from about 30 to about 70 percent of the blend of high and low molecular weight high-cis polybutadiene. The polybutadiene can tolerate small amounts of comonomers, e.g. less than1, 5, or 10 percent of another diene or another monomer, so long as the high molecular weight polybutadiene is compatible with the low molecular weight butadiene and other rubbers in the blend. By compatibility it is meant that the polymers can be mixed thoroughly without macroscopic phase separation.

If a polymer is described as having a number average molecular weight in a certain range then only the number average needs to fall in that range and the polymer may and probably will include a small fraction of polymer chains having a molecular weight outside the specified range.

The low molecular weight polybutadiene desirably has a molecular weight or number average molecular weight from about 2,000 or 4,000 to about 40,000 or 50,000, and is more desirably from about 5,000 to about 20,000 or 25,000. Desirably the molecular weight distribution is from about 1.1 to about 5, and is more desirably from about 1.2 or to about 2.2 . Desirably the cis-1,4 content is at least 70%, more desirably from about 70 to about 97%, preferably at least 85%, and is more preferably from about 85 to about 97%. Desirably the low molecular weight high-cis polybutadiene is from about 20 to about 80 weight percent of the blend of high and low molecular weight high-cis polybutadiene, and is more desirably from about 25 to about 75 weight percent and is preferably from about 30 to about 70 weight percent of the blend. The polybutadiene can tolerate small amounts of comonomers, e.g. less than 1, 5, or 10 percent of another diene or another monomer, so long as the low molecular weight polybutadiene is compatible with the high molecular weight polybutadiene and other rubbers in the blend.

The rubber compounds considered here generally include reinforcing fillers, oil extenders (plasticizers), and curatives. The reinforcing fillers can include carbon black, and silica (optionally with a silane treatment or a silane coupling agent) etc. Desirably the amount of filler is from about 10 to about 100 phr and preferably from about 30 to about 80 parts by weight per one hundred parts by weight of rubber (phr). A plasticizing agent, such as a paraffinic, aromatic, or naphthenic oil, may be used, desirably in an amount from about 0 to about 30 phr and preferably from about 0 to about 15 phr. The curatives are generally sulfur and one or more accelerators although other curatives may be used. The sulfur (if used as a curing agent) is generally present from about 0.5 to about 5 phr. The accelerators are generally used from about 0.5 to about 5 phr.

The rubber compounds are desirably used in a pneumatic tire and more desirably in a tire tread where the material characteristics of the rubber have a direct impact on snow traction, wet traction, and rolling resistance. They may be used in other applications where a certain combination of elastic modulus and hysteretic properties would be of some benefit.

The practice of the present invention is further illustrated by reference to the following examples, which however, should not be construed as limiting the scope of the invention. Parts and percentages shown in the examples are by weight unless otherwise indicated.

General Considerations

Molecular weight and molecular weight distribution were obtained by using a GPC instrument equipped with two Tosoh GMHXL (30 cm) columns connected in line. THF was used as carrier solvent, with a flow rate of 1.0 mL/min. The instrument was universally calibrated with polystyrene standards and Mark-Howick constants for high-cis polybutadienes. Microstructures were obtained by FT-IR measurements. Spectra of $CS_2$ solutions of polymers (0.5 w/v %) were obtained, and the microstructures were calculated by Morello's method

EXAMPLE 1

(Low Molecular Weight Polymer Preparation Using MAO Catalyst System)

To a 7 oz. beverage bottle that was dried in a 120° oven, capped with a rubber seal, and cooled under a stream of nitrogen was added 4.1 mmol butadiene (in hexanes), followed by 40.8 mmol methylaluminoxane (in toluene), 0.41 mmol neodymium(III) versetate (in hexanes), and 13.1 mmol diisobutyl aluminum hydride (in hexanes). Some heat was generated and after about 2 minutes, 0.82 mmol diethylaluminum chloride (in hexanes) was added. This mixture was allowed to react for an additional 2 minutes and then was added to 0.75 mol butadiene (in hexanes, 15.9% Bd w/w) in a 32 oz. beverage bottle, and the reaction vessel was rotated in a 50° C. constant temperature bath for 30 minutes. The reaction vessel was then vented with a needle and 2-propanol and a hexane solution of 2,6-di-t-butyl 4methylphenol was added to terminate the polymerization.

The polymer cement was then poured into an aluminum pan and the solvent was evaporated, leaving a gummy residue. The residue was extracted with hexanes, the insoluble particles were filtered off, and the clear solution was poured into an aluminum pan. After evaporation of the solvent, the polymer was recovered as a clear, colorless, viscous liquid. Tables IA and IB show the specific quantities used as well as the resultant polymer properties.

EXAMPLE 2–4

(Low Molecular Weight Polymer Preparation Using MAO Catalyst System)

The procedure given in Example 1 was followed with variations in the ratio of C1/Nd used. Tables IA and IB show the specific quantities used and the effect of C1/Nd ratio on the polymer properties.

EXAMPLE 5–10

(Low Molecular Weight Polymer Preparation Using MAO Catalyst System)

The procedure given in Example 1 was followed with variations in the amount of catalyst relative to the butadiene solution. Tables IIA and IIB show the specific quantities used and the effect of Nd concentration on the polymer properties.

EXAMPLE 11

(Low Molecular Weight Polymer Preparation Using MAO Catalyst System)

To a nitrogen purged two-gallon stainless steel reactor equipped with a mechanical stirrer and a variable temperature jacket, was added 11.4 mol butadiene in hexanes (1 3.4% Bd w/w). Stirring was initiated and the temperature was maintained at 50° C. Into a nitrogen purged 32 oz. beverage bottle was added via syringe 0.031 mol butadiene in hexanes, 0.31 mol methylaluminoxane (in toluene), 0.0031 mol Nd(III) versetate (in hexanes) and 0.65 mol diisobutylaluminum hydride (in hexanes). After about two minutes, 0.01 9 mol diethylaluminum chloride (in hexanes) was added and the preformed catalyst solution was allowed to react for another two minutes. The catalyst was charged to the reactor to initiate polymerization. After 30 minutes reaction time, the reaction mixture was ejected from the reactor and coagulated with 2-propanol containing 2,6-di-t-butyl-4-methylphenol. A small sample was dried by evaporation of the solvent to determine the polymer properties, and the remaining polymer was maintained as a cement until use. Tables IIA and IIB show specific quantities used and the polymer properties obtained.

The Nd containing compound in Tables IA and IIA is neodymium (III) versetate, the DIBAH is diisobutyl aluminum hydride, and the DEAC is diethyl aluminum chloride.

Tables IIA and IIB illustrate the effect of changing the amount of total initiator relative to the amount of butadiene. Both the Mn and Mw increase as the amount of initiator decreases. Example 11 shows that the polymerization results are independent of batch size.

The following examples 12–18 illustrate how to polymerize the low molecular weight high-cis polybutadiene of the

TABLE IA

| | Catalyst Preparation | | | | | Polymerization Details | | |
|---|---|---|---|---|---|---|---|---|
| Example | Nd mmol | MAO mmol repeat units | DIBAH mmol | DEAC mmol | Bd mmol | Bd mol | Pzn time (min) | Pzn temp. ° C. |
| 1 | 0.41 | 40.8 | 13.1 | 0.82 | 4.1 | 0.75 | 30 | 50 |
| 2 | 0.41 | 40.8 | 13.1 | 1.63 | 4.1 | 0.75 | 30 | 50 |
| 3 | 0.41 | 40.8 | 13.1 | 2.45 | 4.1 | 0.75 | 30 | 50 |
| 4 | 0.41 | 40.8 | 13.1 | 0.82 | 4.1 | 0.75 | 30 | 80 |

TABLE IB

| | Polymer Data | | | | | | | | |
|---|---|---|---|---|---|---|---|---|---|
| Example | Mn | Mw | MWD | % cis | % trans | % vinyl | conv % | Tg ° C. | Tm ° C. |
| 1 | 11604 | 35605 | 3.07 | 83.2 | 15.9 | 0.9 | 98 | −104.91 | −37.41 |
| 2 | 10878 | 32109 | 2.95 | 86.3 | 12.8 | 0.9 | 98 | −104.98 | 42.94 |
| 3 | 9058 | 17566 | 1.94 | 84.1 | 14.9 | 1 | 98 | −104.68 | −41.26 |
| 4 | 14721 | 36391 | 2.47 | 83.5 | 15.6 | 0.9 | 99 | −104.33 | −35.18 |

TABLE IIA

| | Catalyst Preparation | | | | | Polymerization Data | | |
|---|---|---|---|---|---|---|---|---|
| Example | Nd (mmol) | MAO (mmol) repeat units | DIBAH (mmol) | DEAC (mmol) | Bd (mmol) | Bd (mol) | pzn time (min) | pzn temp ° C. |
| 5 | 0.83 | 83.1 | 17.45 | 4.99 | 8.3 | 1.02 | 30 | 50 |
| 6 | 0.54 | 53.6 | 11.3 | 3.22 | 5.4 | 0.99 | 30 | 50 |
| 7 | 0.43 | 42.9 | 9 | 2.57 | 4.3 | 0.99 | 30 | 50 |
| 8 | 0.32 | 32.2 | 6.75 | 1.93 | 3.2 | 0.99 | 30 | 50 |
| 9 | 0.27 | 26.8 | 5.63 | 1.61 | 2.7 | 0.99 | 30 | 50 |
| 10 | 0.16 | 16.1 | 3.38 | 0.96 | 1.6 | 0.99 | 30 | 50 |
| 11 | 3.09 | 308.7 | 64.83 | 18.52 | 31 | 11.4 | 30 | 50 |

TABLE IIB

| | Polymer Data | | | | | |
|---|---|---|---|---|---|---|
| Example | Mn | Mw | MWD | conv % | Tg ° C. | Tm ° C. |
| 5 | 7707 | 12562 | 1.63 | 99 | — | — |
| 6 | 9096 | 17010 | 1.87 | 95 | −104.6 | −50.7 |
| 7 | 11697 | 28102 | 2.4 | 94 | −103.83 | −46.11 |
| 8 | 13486 | 32478 | 2.41 | 93 | −104.08 | −44.89 |
| 9 | 15688 | 34995 | 2.23 | 91 | −103.93 | −47.47 |
| 10 | 28637 | 62484 | 2.18 | 89 | −103.84 | −52.26 |
| 11 | 17173 | 35721 | 2.08 | 99 | — | — | present invention using a catalyst system comprising a trialkyl aluminum compound (i.e., the TIBA catalyst system).

EXAMPLE 12

(Low Molecular Weight Polymer Preparation Using TIBA Catalyst System)

To a nitrogen purged one half-gallon stainless steel reactor equipped with a mechanical stirrer and a variable temperature jacket, was added 3.11 mol butadiene in hexanes (14.5% Bd w/w). Stirring was initiated and the temperature was maintained at 54° C. Into the reactor was added 0.025 mol triisobutylaluminum (in hexanes), followed by 0.015 mol diisobutyl aluminum hydride (in hexanes), and $5.1 \times 10^{-4}$ mol Nd versetate (in hexanes). The polymerization was initiated by the addition of $2.0 \times 10^{-3}$ mol ethylaluminum dichloride and the jacket temperature of the reactor was increased to 82° C. at a rate of 15 degrees/minute. After 45 minutes reaction time, polymerization was essentially complete and the reaction mixture was ejected from the reactor and terminated with 2-propanol containing 2,6-di-t-butyl-4-methylphenol. A small sample was dried by evaporation of the solvent to determine the polymer properties, and the remaining polymer was maintained as a cement until use. Tables IIIA and IIIB show the specific quantities used and the resultant polymer properties.

EXAMPLE 13–14

(Low Molecular Weight Polymer Preparation Using TIBA Catalyst System)

The procedure given in Example 12 was followed with variations in the ratio of DIBAH/Nd used. Tables IIIA and IIIB show the specific quantities used and the effect of DIBAH/Nd ratio on the polymer properties.

EXAMPLE 15–17

(Low Molecular Weight Polymer Preparation Using TIBA Catalyst System)

The procedure given in Example 12 was followed with variations in the ratio of C1/Nd used. Tables IIIA and IIIB show the specific quantities used and the effect of C1/Nd ratio on the polymer properties.

EXAMPLE 18

(Low Molecular Weight Polymer Preparation Using TIBA Catalyst System)

To a nitrogen purged one hundred-gallon stainless steel reactor equipped with a mechanical stirrer and a variable temperature jacket, was added 405 mol butadiene in hexanes (15.6% Bd s/s). Stirring was initiated and the temperature was maintained at 54° C. Into the reactor was added 4.39 mol triisobutylaluminum (in hexanes), followed by $8.77 \times 10^{-2}$ mol neodymium versetate (in hexanes), and 1.32 mol diisobutylaluminum hydride (in hexanes). The polymerization was initiated by the addition of $4.39 \times 10^{-1}$ mol ethylaluminum dichloride and the jacket temperature of the reactor was increased to 82° C. After 25 minutes reaction time, polymerization was essentially complete and the reaction mixture was transferred from the reactor to a large blending tank fitted with a mechanical stirrer. The polymer cement was terminated with 2-propanol containing 2,6-di-t-butyl4-methylphenol and a small sample was removed and dried by evaporation of the solvent to determine the polymer properties. The remaining polymer was stored in the blending tank and blended with a high molecular weight polymer (Example 19) prior to drying.

EXAMPLE 19

(High Molecular Weight Polymer Preparation)

The following example was for the preparation of a high molecular weight polymer for blending with a low molecular weight polymer (Example 18). To a nitrogen purged one hundred-gallon stainless steel reactor equipped with a mechanical stirrer and a variable temperature jacket, was added 386 mol butadiene in hexanes (13.1% Bd w/w). Stirring was initiated and the temperature was maintained at 54° C. Into the reactor was added $6.76 \times 10^{-1}$ triisobutylaluminum (in hexanes), followed by $3.5 \times 10^{-2}$ mol neodymium versetate (in hexanes). The polymerization was initiated after about 10 minutes by the addition of $5.33 \times 10^{-2}$ mol ethylaluminum dichloride. After 60 minutes reaction time, polymerization was essentially complete and the reaction mixture was transferred from the reactor to a large blending tank fitted with a mechanical stirrer. The polymer cement was terminated with 2-propanol containing 2,6-di-t-butyl4-methylphenol and a small sample was removed and dried by evaporation of the solvent to determine the polymer properties.

EXAMPLE 20

(HMW/LMW Polymer Blend)

After four hours of mixing, a blend of the high molecular weight polymer of Example 19 and low molecular weight polymer of Example 18 was dried by using a heated two-roll mill drum drier. The resultant polymer properties are set out in Table IIIB.

TABLE IIIA

| | Catalyst Preparation | | | | | Polymerization Data | | |
| --- | --- | --- | --- | --- | --- | --- | --- | --- |
| Example | Nd mmol | TIBA mmol | DIBAH mmol | EADC mmol | Bd mmol | Pzn time (min) | Init. Temp. ° C. | Jacket Temp. ° C. |
| 12 | 0.505 | 25.3 | 15.2 | 2.02 | 3.11 | 46 | 52 | 82 |
| 13 | 0.505 | 25.3 | 10.2 | 2.02 | 3.11 | 48 | 54 | 82 |
| 14 | 0.505 | 25.3 | 5.05 | 2.02 | 3.11 | 94 | 54 | 82 |
| 15 | 0.505 | 25.3 | 5.05 | 1.01 | 3.11 | 48 | 52 | 82 |
| 16 | 0.505 | 25.3 | 5.05 | 3.03 | 3.11 | 47 | 52 | 82 |
| 17 | 0.505 | 25.3 | 5.05 | 5.05 | 3.11 | 48 | 53 | 82 |

TABLE IIIA-continued

| | Catalyst Preparation | | | | | Polymerization Data | | |
|---|---|---|---|---|---|---|---|---|
| Example | Nd mmol | TIBA mmol | DIBAH mmol | EADC mmol | Bd mmol | Pzn time (min) | Init. Temp. ° C. | Jacket Temp. ° C. |
| 18 | 87.7 | 4386 | 1316 | 439 | 405 | 25 | 54 | 82 |
| 19 | 36 | 675 | 0 | 53 | 386 | 60 | 54 | 54 |

TABLE IIIB

| | Polymer Data | | | | | | | |
|---|---|---|---|---|---|---|---|---|
| Examples | Mn | Mw | Mp | MWD | % < 100,000 | cis | trans | vinyl |
| 12 | 13634 | 97620 | 13235 | 7.16 | 88 | — | — | — |
| 13 | 16906 | 96888 | 19446 | 5.73 | 90 | — | — | — |
| 14 | 14740 | 90558 | 30122 | 3.66 | 91 | — | — | — |
| 15 | 16735 | 119515 | 30520 | 4.47 | 88 | — | — | — |
| 16 | 19634 | 157481 | 22501 | 8.02 | 86 | — | — | — |
| 17 | 14905 | 236477 | 12195 | 15.87 | 80 | — | — | — |
| 18 | 14552 | 39807 | 19196 | 2.74 | 94 | 84 | 15 | 1 |
| 19 | 176172 | 492098 | 309048 | 2.79 | — | 98 | 1.5 | .5 |
| 20 | 25569 | 290694 | 18410 | 11.37 | — | 90 | 9 | 1 |

Comparative Examples A–H and Tables IVA and IVB illustrate the process using various alternative catalyst systems and optionally chain transfer agents results in either low conversions, broad MWD, or lower cis contents or combinations thereof.

Comparative Example A

The conditions for Comparative Example A were set up to essentially follow the conditions taught in *Macromol. Chem. Phys.* 1996, 197, 3515–3521 To a 32 oz. beverage bottle that was dried in a 120° C. oven, capped with a rubber seal, and cooled under a stream of nitrogen, was added 1.4 mol butadiene (in hexanes, 24.9% Bd w/w) followed by 2.8 mmol methylaluminoxane (in toluene) and then 0.28 mmol NiOB (in hexanes). NiOB is defined as a carboxylated nickel oxyborate compound as taught in U.S. Pat. No. 4,502,866. The bottle was then placed in a 50° C. constant temperature bath and rotated end-over-end for 4.5 hours. The bottle was removed from the bath, terminated with 2-propanol and 2,6-di-t-butyl-4-methylphenol, and poured into an aluminum pan. The solvent was evaporated leaving a small amount of gummy polymer residue (conversion<0%).

Comparative Examples B–D

The procedure given in Comparative Example A was followed with variations in the ratio of Al/Ni and the polymerization time. Tables IVA and IVB show the specific quantities used and the effect of polymerization time on the polymer properties. It is clear from the examples given that this method can only produce narrow molecular weight distribution, liquid polymers at very low conversion, and as conversion increases, so does the molecular weight distribution.

Comparative Example E

The procedure given in Comparative Example A was essentially followed, with the addition of toluene as a molecular weight modifier prior to the charging of any catalyst components. Tables IVA and IVB show the specific quantities used and the low conversion caused by adding toluene to the catalyst system.

Comparative Example F

The procedure given in Comparative Example A was essentially followed, with the addition of 1-hexene as a molecular weight modifier prior to the charging of the NiOB catalyst component. Tables IVA and IVB show the specific quantities used and the low conversion caused by adding 1-hexene to the catalyst system.

Comparative Example G

The conditions for Comparative Example G were set up to essentially follow the conditions taught in *Bull. Chem. Soc. Jpn.* 1992, 65,1299–1306. To a 32 oz. beverage bottle that was dried in a 120° C. oven, capped with a rubber seal, and cooled under a stream of nitrogen, was added 1.5 mol butadiene (in hexanes, 24.9% Bd w/w), followed by 15.5 mmol triethylaluminum (in hexanes), 5.13 mmol hexafluoroacetone sesquihydrate (in hexanes), and 1.54 mmol NiOB (in hexanes). The bottle was then placed in a 50° C. constant temperature bath and rotated end-over-end overnight. The bottle was removed from the bath, terminated with 2-propanol and 2,6-di-t-butyl4-mehtylphenol, and poured into an aluminum pan. The solvent was evaporated leaving a gummy polymer residue. It is clear from Tables IVA and IVB that although this procedure produces high yields of liquid polymer, the molecular weight distribution of the polymer is large.

Comparative Example H

The procedure given in Comparative Example G was essentially followed, with the addition of α, α, α-trifluorotoluene as a molecular weight modifier prior to the charging of the NiOB catalyst component, as instructed by *Bull. Chem. Soc. Jpn.* 1992, 65, 1299–1306. Tables IVA and IVB show the specific quantities used and the effects on molecular weight and molecular distribution, by adding trifluorotoluene to the catalyst system.

TABLE IVA

| | Catalyst System | | | | Polymerization Details | | |
|---|---|---|---|---|---|---|---|
| Comp Examples | NiOB mmol | AL source | Al mmol | modifier | Bd mol | pzn time min | pzn temp ° C. |
| A | 0.28 | MAO | 2.8 | none | 1.4 | 270 | 50 |
| B | 0.15 | MAO | 3.06 | none | 1.4 | 270 | 50 |
| C | 0.3 | MAO | 3.01 | NONE | 1.5 | 1080 | 50 |
| D | 0.14 | MAO | 2.96 | none | 1.5 | 1080 | 50 |
| E | 0.96 | MAO | 47.8 | A1, 850 mmol | 4.4 | 60 | 50 |
| F | 0.85 | MAO | 42.3 | A2, 398 mmol | 0.83 | 150 | 50 |
| G | 1.54 | AlEt$_3$ | 15.4 | A3, 5.13 mmol | 1.5 | 1080 | 50 |
| H | 1.54 | AlEt$_3$ | 15.5 | A3, 5.18 mmol A4, 11.6 mmol | 1.5 | 1080 | 50 |

TABLE IVB

Polymer Data

| Examples | Mn | Mw | MWD | % cis | % trans | % vinyl | conv % | Tg ° C. |
|---|---|---|---|---|---|---|---|---|
| A | 7863 | 16527 | 2.1 | — | — | — | <10 | −97.81 |
| B | 7121 | 12247 | 1.72 | — | — | — | <10 | −98.5 |
| C | 21456 | 95823 | 4.47 | — | — | — | <50 | −101.24 |
| D | 8741 | 30554 | 3.5 | — | — | — | <50 | −100.34 |
| E | 10045 | 19706 | 1.96 | 76.3 | 21.4 | 2.3 | 48 | −100.5 |
| F | 7992 | 16436 | 2.06 | 85.92 | 8.07 | 6.01 | 31 | — |
| G | 6417 | 36680 | 5.72 | — | — | — | 84 | −100.06 |
| H | 143900 | 482477 | 3.35 | — | — | — | 15 | −98.16 |

EXAMPLES 21–22

(Rubber Compounds)

The mixing procedure for both Examples 21 and 22 involves mixing in a 65 g Brabender mixer, with batches comprising of polymers, carbon black, stearic acid, antioxidant, aromatic oil and silica, silane coupling agent and optionally wax. The first mixing step was started at 110° C. for 5 minutes. In a second mixing step the zinc oxide, accelerator, and sulfur were added. The second mixing was performed in a 65 g Brabender mixer at 75° C. and had a mixing time of 1 minute. The samples were cured at 170° C. for 15 minutes.

Tensile mechanical properties were measured using the standard procedure described in ASTM-D412. The mechanical values were indexed to a control, which was assigned the value of 100. The tensile test specimen were round rings (having an internal diameter of 0.62 inches) with cross section dimensions of 0.04 inches in width and 0.075 inches in thickness. G' and tan delta were obtained using a Rheometrics Inc., Dynamic-Mechanical Analyzer. The dynamic temperature step test protocol was followed. Test specimen used for dynamic temperature sweep test were rectangular slabs with dimensions of 0.5, 1.5, and 0.075 inches (width, length, and thickness respectively). The following test conditions were used; frequency of 31.4 rad/sec., strain of 0.2% for temperature range from −70° C. to −30° C., while 2% strain was used for a temperature sweep from −30° C. to 100° C. The hardness test (Shore A) was made using a durometer and the standard procedure described in ASTM-2240.

EXAMPLE 21

Rubber compounds were prepared by the following recipe. The first recipe is for blends of high (HMW) and low molecular weight (LMW) rubbers. The second recipe is for a natural rubber/styrene butadiene rubber blend (NR and SBR). The recipes of Table VA were used to prepare the samples of Table VB.

TABLE VA

Recipes for Example 21

| Component | Blend of high and low molecular weight rubbers | Blend of Natural Rubber and Styrene-butadiene rubber |
|---|---|---|
| Rubber | 100 phr | 30/70 phr |
| HAF Carbon black | 50 | 50 |
| Stearic acid | 2 | 2 |
| Antioxidant | 1 | 1 |
| Aromatic oil | 0 | 10 |
| Zinc oxide | 4.2 | 3 |
| Accelerator | 1.06 | 1.05 |
| Sulfur | 1.4 | 1 |

TABLE VB

Results for Example 21

| Characteristic | Control 1 Blend of low cis PBd | Control 2 Blend NR and SBR | Sample A | Sample B | Sample C | Sample D | Sample E |
|---|---|---|---|---|---|---|---|
| HMW | | | | | | | |
| Catalyst | Li | — | Nd | Nd | Nd | Ni | Ni |
| Mn | 240000 | — | 233384 | 233384 | 233384 | 96100 | 96100 |
| Mw/Mn | 1.34 | — | 3.111 | 3.111 | 3.111 | 3.692 | 3692 |
| Cis % | 36.5 | — | 97.8 | 97.8 | 97.8 | 96.5 | 96.5 |
| LMW | | | | | | | |
| Catalyst | Li | — | Nd | Nd | Ni | Ni | NI |
| Mn | 5326 | — | 9876 | 19628 | 7459 | 7429 | 2838 |
| Mw/Mn | 1.07 | — | 2.14 | 1.98 | 4.8886 | 3.722 | 2.734 |
| Cis % | — | — | 85.1 | 88.6 | 86.7 | 86.5 | 80.1 |
| HMW/LMW (wt.) | 50/50 | 30/70 | 58/42 | 52/48 | 72/28 | 61/39 | 58/42 |
| Tension at break | 55 | 100 | 103 | 107 | 108 | 85 | 64 |
| M300 | 55 | 100 | 92 | 94 | 121 | 87 | 65 |

TABLE VB-continued

Results for Example 21

| Characteristic | Control 1 Blend of low cis PBd | Control 2 Blend NR and SBR | Sample A | Sample B | Sample C | Sample D | Sample E |
|---|---|---|---|---|---|---|---|
| EB | 101 | 100 | 103 | 105 | 126 | 102 | 101 |
| G' −20 C. | 181 | 100 | 177 | 129 | 215 | 197 | 179 |
| tan δ 0 C. | 127 | 100 | 100 | 122 | 110 | 124 | 124 |
| tan δ 60 C. | 173 | 100 | 186 | 162 | 129 | 157 | 150 |

The LMW (low molecular weight) rubber used in control 1 was Ricon-131 which is commercially available from Ricon Resin, Inc in Grand Junction, Colo.

Values above 100 for G' at −20° C., tan δ at 0° C., and tan δ at 60° C. indicate that this sample would have an improved snow traction, and rolling resistance over the Control 2 formulation, which is a standard all season tread formulation, based on correlation of these properties with linear viscoelastic measurements of rubber samples.

The results in Table VB predict that Control I, which contains a low-cis polybutadiene, improves snow and wet traction as well as the rolling resistance over Control 2, which is a blend of natural rubber and styrene-butadiene rubber. In this case, the improvements in the listed properties were obtained at the expense of a compromise in tension at break and the elastic modulus at 300% elongation. Samples A–E illustrate that the traction and rolling resistance can be increased relative to Control 2 without a substantial compromise in other properties by using a high-cis polybutadiene. The HMW polybutadiene in Samples D and E (made with a Ni catalyst) had broader molecular weight distributions and slightly lower cis-1,4 content than the HMW polybutadiene in Samples A–C (made with Nd catalyst). The LMW polybutadiene in Samples D and E also had broader MWD (Sample D) or lower cis-1,4 content (Sample E). The results for TB, M300 and EB were slightly lower for Samples D and E. The LMW polybutadiene of Sample C had a much broader molecular weight distribution than the LMW polybutadiene of Samples A and B. The LMW polybutadiene of Samples A and B was prepared following the general procedure outlined in Example 1.

EXAMPLE 22

The control samples 1–3 and Samples F and G of Example 22 were formulated using a different recipe. Table VIA describes the composition of the following control samples (Control 1 through Control 3) and Samples F and G made in accordance with the present invention. Control 1 demonstrates the effect of a low molecular weight oil on the physical properties of low-cis butadiene rubber. Control 2 demonstrates the effect of using a blend of high molecular weight and low molecular weight low-cis butadiene rubber. Control 3 demonstrates the effect of using a commercial high-cis butadiene rubber with a low molecular weight oil component. Samples F and G of the present invention demonstrate the effect of using a blend of high molecular weight high-cis butadiene rubber prepared with a Nd-based catalyst (prepared following the general procedure outlined in Example 19), and a low molecular weight high-cis butadiene rubber prepared with the MAO-based catalyst (prepared following the general procedure outlined in Example 1) and the TIBA-based catalyst (prepared following the general procedure outlined in Example 12). The resultant properties of the blends A and B of high molecular weight/low molecular weight butadiene rubbers are shown in Table VIB.

The results in Table VIC predict that Samples F and G made according to the present invention improve wear related properties based upon Lambourn, Tensile and Tear measurements. The G' at 20° C. is predictive of the snow traction performance and the tan δ at 0° C. is predictive of the wet traction performance. The results corresponding to Samples F and G show improved snow traction properties at no loss of wet traction properties.

TABLE VIA

|  | Control 1 | Control 2 | Control 3 | Sample F | Sample G |
|---|---|---|---|---|---|
| Master |  |  |  |  |  |
| Solution Styrene Butadiene Rubber (20% Styrene) | 40 | 40 | 40 | 40 | 40 |
| NR (Natural Rubber) | 20 | 20 | 20 | 20 | 20 |
| Low-cis butadiene rubber | 40 | 40 | 0 | 0 | 0 |
| HMW/LMW (MAO-based Liq. BR) blend A | 0 | 0 | 0 | 80 | 0 |
| HMW/LMW B (TIBA-based Liq. BR) blend B | 0 | 0 | 0 | 0 | 80 |
| Ni High Cis BR | 0 | 0 | 40 | 0 | 0 |
| Aromatic Oil | 40 | 0 | 40 | 0 | 0 |
| Ricon Low-Cis Liquid BR | 0 | 40 | 0 | 0 | 0 |
| Silica | 18 | 18 | 18 | 18 | 18 |
| N343 Carbon Black | 34 | 34 | 34 | 34 | 34 |
| Antioxidant | 0.95 | 0.95 | 0.95 | 0.95 | 0.95 |
| Wax | 1.5 | 1.5 | 1.5 | 1.5 | 1.5 |
| TOTAL | 194.45 | 194.45 | 194.45 | 194.45 | 194.45 |
| Remill |  |  |  |  |  |
| Master Batch | 194.45 | 194.45 | 194.45 | 194.45 | 194.45 |
| Silica | 16 | 16 | 16 | 16 | 16 |
| Silane Coupling Agent | 6.8 | 6.8 | 6.8 | 6.8 | 6.8 |
| Stearic acid | 1 | 1 | 1 | 1 | 1 |
| TOTAL | 218.25 | 216.25 | 218.25 | 218.25 | 218.25 |
| Final |  |  |  |  |  |
| Remill | 218.25 | 218.25 | 218.25 | 218.25 | 218.25 |
| Sulfur | 1.8 | 1.8 | 1.8 | 1.8 | 1.8 |
| Accelerator 1 | 1.8 | 1.8 | 1.8 | 1.8 | 1.8 |
| Accelerator 2 | 0.9 | 0.9 | 0.9 | 0.9 | 0.9 |
| Zinc Oxide | 2 | 2 | 2 | 2 | 2 |
| TOTAL | 224.75 | 224.75 | 224.75 | 224.75 | 224.75 |

TABLE VIB

| | HMW Portion | | | | LMW Portion | | | | Overall | |
|---|---|---|---|---|---|---|---|---|---|---|
| | Mn | MW | MWD | % HMW | Mn | MW | MWD | % LMW | cis % | Tg (° C.) |
| HMW/LMW blend A (MAO-based liquid BR) | 352694 | 764638 | 2.17 | 47.5 | 8846 | 14323 | 1.62 | 52.5 | 90.5 | −101.27 |
| HMW/LMW blend B (MAO-based liquid BR) | 246472 | 536034 | 2.17 | 52.2 | 12920 | 22671 | 1.75 | 47.8 | 90.4 | −107.95 |

TABLE VIC

| Test | Control 1 | Control 2 | Control 3 | Sample F | Sample G |
|---|---|---|---|---|---|
| Lambourn | | | | | |
| 65% Slip (mg) | 118.6 | 83.8 | 111.8 | 57.7 | 66.3 |
| Ring Tensile RT | | | | | |
| 100% Modulus (psi) | 283 | 241 | 278 | 272 | 261 |
| 300% Modulus (psi) | 1132 | 883 | 1155 | 1089 | 1005 |
| Maximum Stress (psi) | 2416 | 2168 | 2525 | 2985 | 2512 |
| Maximum Strain % | 527 | 575 | 532 | 585 | 564 |
| Ring Tensile 100° C. | | | | | |
| 100% Modulus (psi) | 219 | 183 | 240 | 242 | 244 |
| 300% Modulus (psi) | 885 | 677 | 968 | 877 | 864 |
| Maximum Stress (psi) | 1214 | 1099 | 1373 | 1529 | 1336 |
| Maximum Strain % | 381 | 432 | 390 | 441 | 415 |
| Ring Tear Room T | | | | | |
| Load at Tear (lbs) | 50 | 38 | 50 | 75 | 63 |
| Tear Strength (lbs/in) | 475 | 362 | 491 | 621 | 550 |
| Travel at Tear (%) | 497 | 524 | 511 | 620 | 590 |
| Linear Viscoelastic Properties | | | | | |
| 1 Hz, 0.5% Strain tan δ (0 C.) | 0.18 | 0.20 | 0.19 | 0.19 | 0.19 |
| G' (−20 C.) (dyne/cm$^2$) | 2.8E+08 | 1.6E+08 | 2.2E+08 | 1.1E+08 | 1.3E+08 |
| Compound Tg-Max tan δ | −37 | −53 | −43 | −53 | −54 |

While in accordance with the patent statutes the best mode and preferred embodiment have been set forth, the scope of the invention is not limited thereto, but rather by the scope of the attached claims.

What is claimed is:

1. A polymer comprising: a liquid polydiene having at least 80 mole percent cis-1,4-butadiene microstructure, a molecular weight distribution of less than 3.1, and a number average molecular weight from about 2,000 to about 50,000.

2. A polymer according to claim 1, wherein said cis-1,4-butadiene content is at least 85 mole percent of the total repeating units.

3. A polymer according to claim 1, wherein said molecular weight distribution is from about 1.2 to about 2.2 for the polydiene.

4. A polymer according to claim 1, wherein said number average molecular weight is from about 4,000 to about 25,000.

5. A polymer according to claim 2, wherein said molecular weight distribution is from about 1.2 to about 2.2 for the polydiene.

6. A polymer according to claim 2, wherein said number average molecular weight is from about 4,000 to about 25,000.

7. A polymer according to claim 5, wherein said number average molecular weight is from about 4,000 to about 25,000.

8. A polymer according to claim 2, wherein at least 95 percent of the repeating units of said polydiene are derived from polymerizing butadiene.

9. A polymer according to claim 7, wherein at least 95 percent of the repeating units of said polydiene are derived from polymerizing butadiene.

10. A polymer comprising: a low molecular weight polydiene having at least 80 mole percent cis-1,4-butadiene microstructure, a number average molecular weight less than 35,000, and a ratio of Mp to Mn between about 0.9 and about 2.0, at least 80 weight percent of said polydiene having a molecular weight less than 100,000.

11. A polymer according to claim 10, wherein said cis-1,4-butadiene content is at least 85 mole percent of the total repeating units.

12. A polymer according to claim 10, wherein at least 85 weight percent of said polydiene has a molecular weight less than 100,000.

13. A polymer according to claim 10, wherein said number average molecular weight is from about 4,000 to about 25,000.

14. A polymer according to claim 11, wherein at least 88 weight percent of said polydiene has a molecular weight less than 100,000.

15. A polymer according to claim 11, wherein said number average molecular weight is from about 4,000 to about 25,000.

16. A polymer according to claim 14, wherein said number average molecular weight is from about 4,000 to about 25,000.

17. A polymer according to claim 11, wherein at least 95 percent of the repeating units of said polydiene are derived from polymerizing butadiene.

18. A polymer according to claim 16, wherein at least 95 percent of the repeating units of said polydiene are derived from polymerizing butadiene.

19. A process for polymerizing a low molecular weight polydiene in the liquid comprising:
polymerizing a conjugated diene in the presence of a catalyst comprising an effective amount of a neodymium-containing compound; an organoaluminum hydride; a source; and an aluminum-containing compound selected from the group consisting of an aluminoxane and a trialkyl aluminum compound to generate at least one polymer chain per 1000 conjugated diene molecules.

20. A process according to claim 19, wherein the mole ratio of said aluminoxane to said neodymium is from about 10 to about 500 when said aluminoxane is selected as said aluminum-containing compound.

21. A process according to claim 19, wherein the mole ratio of said organoaluminum hydride to said neodymium is from about 10 to about 100 when said aluminoxane is selected as said aluminum-containing compound.

22. A process according to claim 19, wherein the mole ratio of said halide source to said neodymium is from about 1 to about 15 when said aluminoxane is selected as said aluminum-containing compound.

23. A process according to claim 19, wherein the mole ratio of said trialkyl aluminum compound to said neodymium is from about 30 to about 200 when said trialkyl aluminum compound is selected as said aluminum-containing compound.

24. A process according to claim 19, wherein the mole ratio of said organoaluminum hydride to said neodymium is from about 1 to about 100 when said trialkyl aluminum compound is selected as said aluminum-containing compound.

25. A process according to claim 19, wherein the mole ratio of said halide source to said neodymium is from about 2 to about 16 when said trialkyl aluminum compound is selected as said aluminum-containing compound.

26. A process according to claim 19, wherein said neodymium-containing compound, aluminoxane, organoaluminum hydride, and halide source are premixed with less than 10 mole percent of the total conjugated diene and reacted with said conjugated diene at a temperature between 10 and 90° C. prior to the addition of the remainder of the conjugated diene.

27. A process according to claim 19, wherein said neodymium containing compound comprises a neodymium carboxylate.

28. A process according to claim 27, wherein said neodymium carboxylate is soluble at a concentration of at least 0.2 molar in aliphatic or cycloaliphatic solvents at 25° C.

29. A process according to claim 19, wherein said halide source is a metal halide, alkyl metal halide, benzyl halide, allyl halide, or alkyl halide.

30. A process according to claim 19, wherein said polymerization is conducted in the presence of a hydrocarbon solvent, and the polymerization temperature is from about 10 to about 130° C.

31. A process according to claim 19, wherein at least 95 mole percent of said conjugated diene is butadiene.

32. A process according to claim 19, wherein said halide source is a chloride.

33. A process according to claim 19, wherein the amount of total aluminum is from about 0.01 to about 0.1 moles per mole of total diene.

34. A process according to claim 20, wherein said aluminoxane is methylaluminoxane (MAO).

35. A process according to claim 23, wherein said trialkyl aluminum compound is triisobutylaluminum (TIBA).

36. A high-cis polybutadiene blend comprising:
(a) from about 20 to about 80 percent by weight of a first polybutadiene having a number average molecular weight from about 2000 to about 50,000, and a cis-1,4 microstructure content of at least 70 percent; and
(b) from about 20 to about 80 percent by weight of a second polybutadiene having a number average molecular weight from about 90,000 to about 300,000, and a cis-1,4 microstructure content of at least 92 percent.

37. The blend according to claim 36, wherein the first polybutadiene has a molecular weight distribution from about 1.1 to about 5.0.

38. The blend according to claim 36, wherein the first polybutadiene has a number average molecular weight from about 4000 to about 25,000.

39. The blend according to claim 36, wherein at least 95 percent of the repeating units of the first polybutadiene are derived from polymerizing butadiene.

40. The blend according to claim 36, wherein the first polybutadiene has a cis-1,4 microstructure content of at least 85 percent.

41. The blend according to claim 37, wherein the first polybutadiene has a molecular weight distribution from about 1.1 to about 2.2.

42. The blend according to claim 36, wherein at least 80 weight percent of the first polybutadiene has a molecular weight less than 100,000.

43. The blend according to claim 42, wherein at least 85 weight percent of the first polybutadiene has a molecular weight less than 100,000.

44. The blend according to claim 42, wherein the first polybutadiene has a ratio of Mp to Mn between about 0.9 and about 2.0.

45. The blend according to claim 44, wherein the first polybutadiene has a number average molecular weight less than 35,000.

46. The blend according to claim 36, wherein the second polybutadiene has a molecular weight distribution from about 1.8 to about 6.0.

47. The blend according to claim 46, wherein the second polybutadiene has a molecular weight distribution from about 1.8 to about 3.2.

48. The blend according to claim 36, wherein the weight percent of the second polybutadiene is from about 30 percent to about 70 percent of the high-cis polybutadiene blend.

49. The blend according to claim 48, wherein the weight percent of the first polybutadiene is from about 30 percent to about 70 percent of the high-cis polybutadiene blend.

50. A rubber compound comprising:
rubber and reinforcing filler, wherein at least 30 phr of said rubber has at least 70 mole percent cis-1,4-butadiene microstructure and includes;
a) from about 20 to about 80 weight percent, based on said rubber which has at least 70 percent cis-1,4-polybutadiene, of a first polybutadiene portion having a molecular weight from about 2,000 to about 50,000 and a cis-1,4 microstructure content of at least 70 percent; and,
b) from about 20 to about 80 weight percent of a second polybutadiene portion having a molecular weight from about 90,000 to about 300,000 and a cis-1,4 microstructure content of at least 92 percent.

51. A rubber compound according to claim 50, wherein at least 50 phr of said rubber consists of said first polybutadiene portion and said second polybutadiene portion.

52. A rubber compound according to claim 51, wherein said rubber which has at least 70 mole percent cis 1,4-butadiene microstructure has a molecular weight distribution which has at least two modes with a first mode of said distribution having a maximum between a molecular weight of 2,000 and 50,000 and a second mode of said distribution having a maximum between a molecular weight of 90,000 and 300,000.

53. A rubber compound according to claim 52, wherein the molecular weight distribution of said first mode is from about 1.1 to about 5 and the molecular weight distribution of said second mode is from about 1.8 to about 6.

54. A rubber compound according to claim 50, wherein said cis-1,4-microstructure of said first polybutadiene is at least 85 percent of the total microstructure of said first polybutadiene.

55. A rubber compound according to claim 53, wherein said cis-1,4-microstructure of said first polybutadiene is at least 85 percent of the total microstructure of said first polybutadiene.

56. A rubber compound according to claim 55, wherein the molecular weight distribution of said first mode is from about 1.2 to about 2.2.

57. A rubber compound according to claim 53, wherein at least 80 weight percent of said first polybutadiene has a molecular weight less than 100,000.

58. A rubber compound according to claim 57, wherein the first polybutadiene has a number average molecular weight less than 35,000, and a ratio of Mp to Mn between about 0.9 and about 2.0.

59. A rubber compound comprising:
   rubber and reinforcing filler, wherein at least 30 phr of said rubber consists essentially of
      a) from about 20 to about 80 weight percent of a first polybutadiene having a number average molecular weight from about 2,000 to about 50,000, a molecular weight distribution from about 1.1 to about 5.0, and a cis-1,4 microstructure content of at least 70 percent; and,
      b) from about 20 to about 80 weight percent of a second polybutadiene having a number average molecular weight from about 90,000 to about 300,000, a molecular weight distribution from about 1.8 to about 6, and a cis-1,4 microstructure content of at least 92 percent.

60. A rubber compound according to claim 59, being formed into a pneumatic tire.

61. A rubber compound according to claim 60, wherein said number average molecular weight of said first polybutadiene is from about 5,000 to about 25,000.

62. A rubber compound according to claim 60, wherein said number average molecular weight of said second polybutadiene is from about 150,000 to about 280,000.

63. A rubber compound according to claim 60, wherein said molecular weight distribution for said first polybutadiene is from about 1.2 to about 2.2.

64. A rubber compound according to claim 60, wherein said molecular weight distribution for said second polybutadiene is from about 1.8 to about 3.2.

65. A rubber compound according to claim 60, wherein said cis-1,4 microstructure of said first polybutadiene is at least 85 percent of the total repeating units.

66. A rubber compound according to claim 61, wherein said cis-1,4 microstructure of said second polybutadiene is at least 94 percent of the total microstructure of said second polybutadiene.

67. A rubber compound according to claim 61, wherein said cis-1,4 microstructure of said first polybutadiene is at least 85 percent of the total microstructure of said first polybutadiene.

68. A rubber compound according to claim 59, wherein said molecular weight distribution for said first polybutadiene is from about 1.2 to about 2.2.

69. A rubber compound according to claim 61, wherein said molecular weight distribution for said second polybutadiene is from about 1.8 to about 3.2.

70. A rubber compound according to claim 67, wherein said molecular weight distribution for said first polybutadiene is from about 1.8 to about 3.2.

71. A rubber compound according to claim 70, wherein said molecular weight distribution for said second polybutadiene is from about 1.2 to about 2.2.

72. A rubber compound according to claim 67 being formed into a tread of a pneumatic tire.

73. A rubber compound according to claim 59, wherein said number average molecular weight for said first polybutadiene is less than 35,000, at least 80 weight percent of said first polybutadiene having a molecular weight less than 100,000.

74. A rubber compound according to claim 73, wherein said first polybutadiene has a ratio of Mp to Mn between about 0.9 and about 2.0.

75. A rubber compound according to claim 74, wherein said cis-1,4 microstructure of said first polybutadiene is at least 85 percent of the total microstructure of said first polybutadiene and said cis-1,4 microstructure of said second polybutadiene is at least 94 percent of the total microstructure of said second polybutadiene.

76. A rubber compound according to claim 60, wherein said number average molecular weight for said first polybutadiene is less than 35,000, at least 80 weight percent of said first polybutadiene having a molecular weight less than 100,000.

77. A rubber compound according to claim 73, wherein at least 88 weight percent of said first polybutadiene has a molecular weight less than 100,000.

78. A rubber compound according to claim 76, wherein at least 88 weight percent of said first polybutadiene has a molecular weight less than 100,000.

* * * * *